May 30, 1933. S. W. MATHIAS 1,912,339
CHUCK AND CHUCK INDEXING MECHANISM
Original Filed Nov. 28, 1927 2 Sheets-Sheet 1
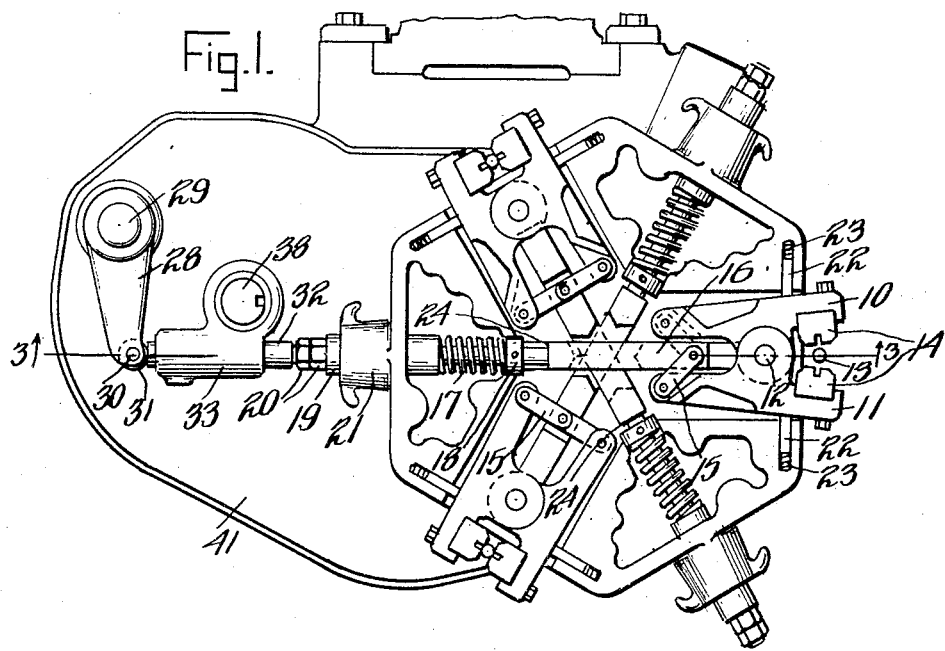
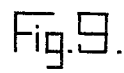
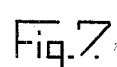
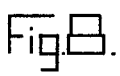
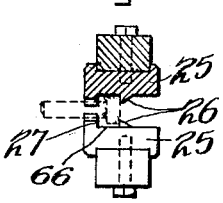
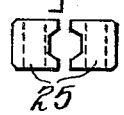
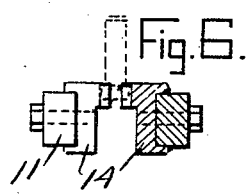
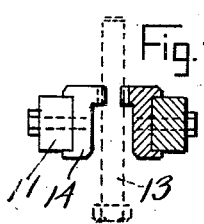
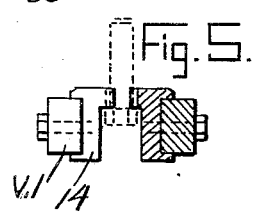
Inventor
Samuel W. Mathias
By
Attorney May 30, 1933.  S. W. MATHIAS  1,912,339
CHUCK AND CHUCK INDEXING MECHANISM
Original Filed Nov. 28, 1927  2 Sheets-Sheet 2
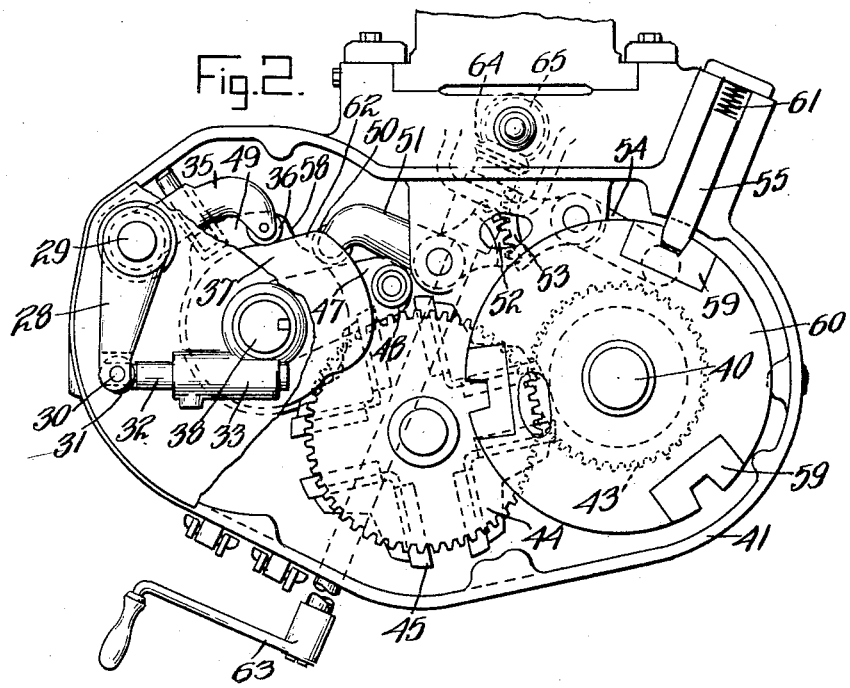
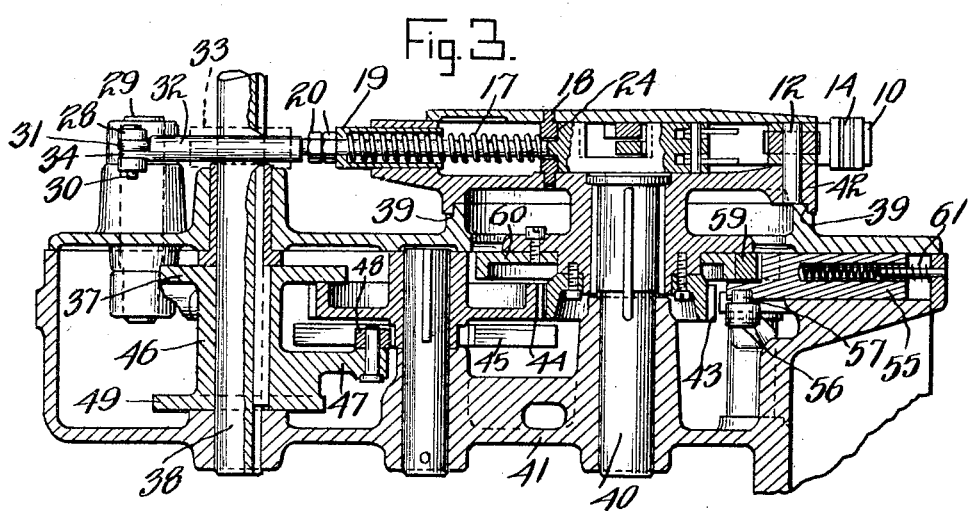
Inventor
Samuel W. Mathias Patented May 30, 1933

1,912,339

UNITED STATES PATENT OFFICE

SAMUEL W. MATHIAS, OF WAYNESBORO, PENNSYLVANIA, ASSIGNOR TO LANDIS MACHINE COMPANY, OF WAYNESBORO, PENNSYLVANIA, A CORPORATION OF PENNSYLVANIA

CHUCK AND CHUCK INDEXING MECHANISM

Original application filed November 28, 1927, Serial No. 236,258. Divided and this application filed July 13, 1929. Serial No. 378,054.

This invention relates to chucks and chuck indexing mechanism, and is a division of my co-pending application Serial No. 236,258 filed November 28, 1927, for Forming and threading machines.

An object of the invention is to provide a new and improved chuck and chuck indexing mechanism.

Another object of the invention is to provide an improved chuck which will adapt itself to inaccuracies of work without affecting or injuring the threads which are cut and which may be adjusted for work of various sizes and lengths with the greatest ease.

A further object is to provide a chuck for holding the work in line with the axis of the threading die head regardless of variation in the diameter of the work, and further to provide means for chucking work near the threaded portion without any loss of gripping pressure on the work.

Referring to the accompanying drawings, which are made a part hereof, and on which similar reference characters indicate similar parts, Figure 1 is a plan view of the chuck turret showing the operating mechanism of the chuck in detail.

Figure 2 is a plan view showing the turret operating mechanism,

Figure 3 is a section on line 3—3 of Fig. 1,

Figure 4 is a partial end view of the chuck shown in Fig. 1, looking from the right, showing the chuck gripping a long bolt, Figure 5 is a view similar to Fig. 4, showing a short piece of work in the chuck, Figure 6 is a view similar to Fig. 4, but showing the work being gripped by its head, Figure 7 is a plan view of Fig. 6, Figure 8 is a modified form of chuck in which the work is loosely held, and Figure 9 is an end view partly in section of the chucks of Fig. 8.

In chucks wherein the axis of the grippers is at a right angle to the axis of the bolt the gripping faces are parallel to the axis of the bolt in one position only, and when the diameter of the work varies, as it does quite frequently, the gripping jaws make contact on the work at one point only. This results in a poor gripping contact on the work. In my construction the gripping faces lie in planes which are parallel to the axis of the work at all times whether the jaws are engaging work of large or small diameter. As shown in Fig. 1, the chuck grippers 10 and 11 are pivoted on a stud 12 which is parallel to the position of the work 13, as shown in Fig. 4. The chuck grippers have mounted within them gripping jaws 14 which may be removed when worn out, or, when desired, be replaced by jaws of a different size. The grippers are operated through the medium of toggle links 15 which are attached to the rear end of the grippers, one end of the links being pivotally attached to a rod 16. A spring 17 has one end abutting against a block 18 fixed to the turret 42 and the other end is positioned within a sliding sleeve 19 axially held on the rod 16 by means of nuts 20. The sleeve 19 may slide in suitable guideways in the turret. It will be seen from the structure just defined that the spring 17 provides a yielding gripping action on the work, which prevents injury to the grippers in case same obstacle should be encountered. Positioned in the turret casing are spring pressed sliding blocks 22 which prevent the entrance of dirt and other foreign matter into the mechanism within the turret casing. These blocks are always kept in sealing contact against the back of the grippers by means of springs 23 seated in bores at the back end of the blocks. While normally the bolt will be gripped as shown in Figs. 4 or 5 it may nevertheless be gripped by the head as shown in dotted lines in Fig. 6. When jaws are made which grip the work in the manner just stated they are made so that the work will be gripped before the rod reaches the limit of its travel which is when the shoulder 24 on the rod 16 comes in contact with the stationary block 18. As noted, the shoulder 24 limits the closing of the chuck grippers to a predetermined distance which permits the jaws to be so made that they will allow the work to float in them a slight amount, as shown best in Figs. 8 and 9. In the jaws 25 of this type of chuck the work is approximately centered and squared up by the jaw faces which have a slightly larger radius than the radius of the work. It is necessary in this case for the work to have a square, hexagonal or other polygonal head in order to prevent it from turning in the jaws. The work is prevented from turning in the jaws by jaw faces 66 which form sides of sockets slightly larger than the work. Within the jaws are extending lips or shoulders 26, which prevent the bolt from slipping down during the forming operation on a bolt and during the starting of the thread cutting tools on it. The bolt of course is prevented from pulling out of the jaws by the faces 27 on the jaws. When the work is permitted a slight floating action as is possible with the structures shown in Figs. 8 and 9 the bolt readily centers itself in the die head so that the threads are cut accurately upon the work.

The gripping jaws are opened in the following manner. An arm 28 is keyed to a shaft 29. In the outer end of the arm is a pin 30 which carries a roller 31 which rests against the outer end of a plunger 32 slidable in a sleeve 33 mounted on the top of housing 41. The plunger 32 has a flattened end 34 which is drilled to receive the pin 30. The hole in the end 34 is larger than the pin so as to permit necessary movement of the arm 28 without binding. The shaft 29 also carries an arm 35 secured thereon, the outer end of the arm carrying a roller 36 for engaging a cam 37. Upon each indexing of the turret which carries the chucks the arm 35 is rocked to press the plunger 32 in to forcibly open the gripping jaws. As previously stated, the jaws are moved to closed position by the spring 17. The cam 37 is operated by a shaft 38 driven from some suitable connection to the power drive of the threading machine, or it may be operated by any other means which is driven in timed relation with indexing of the chucks.

The means for moving the gripping jaws to the position at which work is fed to them will now be described. This mechanism is spoken of throughout as the indexing mechanism. The chuck turret 42 is mounted on the finished seat 39 and pivots on a shaft 40 which is pressed into the main supporting casing 41. Fastened to the chuck turret 42 is a gear 43 which engages a gear 44 cut on the four-station Geneva wheel 45, these gears having a ratio of 3 to 4 so that one-fourth of a revolution of the wheel 44 turns the chuck turret 42 one-third of a revolution. Keyed to the auxiliary cam shaft 38 which revolves continuously during the operation of the machine is a double cam 46 provided with an arm 47 which carries a roller 48 which engages the Geneva wheel. Just before the roller 48 engages the Geneva wheel 45 preparatory to indexing the chuck turret 42 a lobe 49 on the double cam 46 comes into contact with a roller 50 carried by a lever 51 which is provided with a segment of a gear 52 which engages a segment of a gear 53 that is a part of the lever 54. The opposite end of the lever 54 engages a lock bolt 55 through the medium of a pin 56 and a block 57. The double cam 46 continuing to revolve, lobe 58 forces the lever 51 out and withdraws the lock bolt 55 from the lock bolt block 59 which is fastened in plate 60, which in turn is fastened to the chuck turret 42. The contour of lobe 58 is so cut and the cam is so timed that the lock bolt 55 will be only partially withdrawn at the time that the roller 48 engages the Geneva wheel 45. The lock bolt 55 is entirely released from being controlled by lobe 58 before the indexing of the chuck turret 42 is completed. A spring 61 is positioned back of the lock bolt 55 to force it into the slot in the lock bolt block 60 and retain it there until it is again withdrawn through the action of the lobe 58. After the indexing of the chuck turret is completed a lobe 62 on the cam 37 comes into contact with the roller 36 carried by the lever 35 which is keyed to the shaft 29. On the opposite end of the shaft 29 is keyed the lever 28 which operates the plunger 32 which in turn operates the rods 16 to open the chucks. A dwell on the cam lobe 62 holds the chuck grippers open a sufficient length of time to permit placing a piece of work into the jaws. As the cam 37 continues to revolve the lobe 62 is carried away from roller 36 permitting the spring 17 to close the chuck and grip the work in position to be operated upon. Through the medium of a hand operated lever 63 and bevel gears 64 and 65 the chucking turret may be moved parallel to the axis of the threading head to enable the operator to adjust the chuck turret for various lengths and classes of work.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. A work chuck comprising a rotatable body, movable members mounted therein and pivoted on pins parallel to the axis of the work and the axis of rotation of the body, jaws adapted to hold work, mounted in said movable members, said jaws having a portion of their faces radiused slightly larger than the diameter of the work operated upon and another portion of their faces forming sides of sockets slightly larger than the work and flattened to engage a polygonal surface on the work, means for moving said movable members, and means to stop said movable members at a predetermined point to hold the work loosely therein to permit it to accommodate itself freely to the position of a working tool, substantially as set forth.

2. Work holding means comprising a rotatable chuck turret, movable members mounted therein and pivoted on pins parallel to the axis of rotation of the turret, removable jaws mounted in said movable members said jaws having a portion of their faces radiused slightly larger than the diameter of the work operated upon and another portion of their faces forming sides of sockets slightly larger than the work and flattened to engage a polygonal surface on the work, means for moving said movable members, and means to stop said movable members without said removable jaws gripping said work, substantially as set forth.

3. Work holding means comprising a rotatable chuck turret, movable members mounted therein and pivoted on pins parallel to the axis of rotation of the turret, removable jaws mounted in said movable members said jaws having a portion of their faces radiused slightly larger than the diameter of the work operated upon and another portion of their faces forming sides of sockets slightly larger than the work and flattened to engage a polygonal surface on the work, means for moving said movable members, said means comprising a shaft parallel with the axis of rotation of the turret, an arm on said shaft, a rod pivotally attached to said movable members and engageable by said arm for moving said rod in one direction and resilient means for moving it in the other direction, and means to stop said movable members at work holding position without said removable jaws gripping said work, substantially as set forth.

4. In a device of the character described, a work chucking and indexing device comprising a casing, a rotatable chuck turret mounted thereon, means for indexing and intermittently rotating the chuck turret, said chuck turret comprising a plurality of movable members to form a plurality of chucks, said moving members pivoted on pins parallel to axis of rotation of said chuck turret, resilient means for moving said movable members so as to exert gripping pressure on the work by said movable members, said indexing device comprising a cam, a Geneva wheel and a lock bolt for controlling the intermittent movement of said chuck turret, all of said chucks, chuck turret, cam Geneva wheel, lock bolt, and operating means for all of said parts mounted in one casing and adjustable as a unit, substantially as set forth.

5. Work chucking means comprising a rotatable body having movable members pivotally mounted therein on pins parallel with the axis of rotation of the body and with the axis of the work to be gripped, said members having removable jaws mounted therein, resilient means operably connected thereto for moving said movable members to work engaging position, means acting on said resilient means for moving said gripping jaws and said movable members to release the work, said last named means comprising a shaft having a pair of crank levers mounted thereon, a cam engageable with one of said crank levers to oscillate said shaft, the other lever being engageable with a bar for moving said movable members away from said work all of said means being adjustable as a unit, substantially as set forth.

6. A work chucking mechanism comprising a casing having a pair of shafts journaled therein, a chuck turret rotatably mounted upon one of the shafts, a plurality of cams mounted upon the other shaft, a shaft intermediate the first named shafts having a Geneva wheel mounted thereon, said Geneva wheel being operable by said other shaft and in turn being connected to the chuck turret to rotate the turret, said turret having a plurality of movable chucks mounted therein, resilient means carried by said turret for moving the chucks to work engaging position, a plunger carried by said casing, and means operable by a cam on one of said shafts for operating said plunger to move the chucks to work releasing position, and means for stopping closing of the chucks independent of engagement of the chuck jaws with the work to be gripped whereby the work may be loosely held so that the blank work pieces may align themselves with the axis of a working tool, substantially as set forth.

7. In a bolt threading machine, work holding means comprising a casing having a chuck turret rotatably mounted therein, a plurality of chucks mounted in the turret, means for locking the turret in predetermined position and means for rotating it to bring each of the chucks successively to a predetermined position, said rotating and locking means comprising an operating shaft mounted in said casing and parallel with the axis of rotation of the turret, said casing being slidable axially of the said shaft and an intermediate shaft between the operating shaft and the axis of rotation of the turret, said intermediate shaft being mounted within the casing and carrying operating connections between the driving shaft and the turret, and means for moving the casing to position the turret and its operating mechanism as a unit toward and from work operating tools, substantially as set forth.

In witness whereof, I have hereunto set my hand at Waynesboro, Pennsylvania this 5th day of July, A. D. nineteen hundred and twenty-nine.

SAMUEL W. MATHIAS.